(12) United States Patent
Kozykowski

(10) Patent No.: US 8,256,128 B2
(45) Date of Patent: Sep. 4, 2012

(54) CHAINSAW CHAIN TOOTH MEASURING TOOL

(76) Inventor: George Kozykowski, Middletown, NY (US)

( * ) Notice: Subject to any disclaimer, the term of this patent is extended or adjusted under 35 U.S.C. 154(b) by 0 days.

(21) Appl. No.: 13/253,343

(22) Filed: Oct. 5, 2011

(65) Prior Publication Data

US 2012/0159798 A1 Jun. 28, 2012

Related U.S. Application Data

(60) Provisional application No. 61/427,397, filed on Dec. 27, 2010.

(51) Int. Cl.
*G01B 3/56* (2006.01)
(52) U.S. Cl. .................. 33/534; 33/783; 33/810
(58) Field of Classification Search .............. 33/783, 33/784, 810, 811
See application file for complete search history.

(56) References Cited

U.S. PATENT DOCUMENTS

| | | | | |
|---|---|---|---|---|
| 3,503,131 A * | 3/1970 | Warner | | 33/810 |
| 4,570,349 A * | 2/1986 | Finkelman et al. | | 33/784 |
| 5,056,238 A * | 10/1991 | Chi | | 33/810 |
| 5,379,633 A * | 1/1995 | Flisram et al. | | 73/104 |
| 6,105,446 A * | 8/2000 | Rein | | 73/865.9 |
| 6,594,913 B1 * | 7/2003 | Reilly | | 33/534 |
| 6,766,583 B2 * | 7/2004 | Economaki | | 33/534 |
| 6,834,439 B2 * | 12/2004 | Matsumiya et al. | | 33/706 |
| 6,990,746 B2 * | 1/2006 | Penna et al. | | 33/784 |
| 7,475,493 B2 * | 1/2009 | Haglof | | 33/784 |
| 7,533,474 B2 * | 5/2009 | Saito et al. | | 33/811 |
| 7,685,735 B2 * | 3/2010 | Kim | | 33/784 |
| 7,721,455 B2 * | 5/2010 | Matsumiya et al. | | 33/505 |
| 7,735,237 B1 * | 6/2010 | Moon | | 33/783 |
| 2003/0051361 A1 * | 3/2003 | Economaki | | 33/534 |

* cited by examiner

*Primary Examiner* — Yaritza Guadalupe-McCall
(74) *Attorney, Agent, or Firm* — Daniel Boudwin; Alex Boyer; Christopher Feigenbut

(57) ABSTRACT

The present invention discloses an improved chainsaw measuring devices that allows a user to accurately and quickly measure the necessary widths and angles required for sharpening a chainsaw chain cutting tooth. The device comprises a caliper capable of measuring the width of the top plate and includes a built-in gauge for measuring the angle of the top plate cutting edge. This allows a user to individually and accurately sharpen a chainsaw chain without relying on a professional sharpening service.

13 Claims, 2 Drawing Sheets

CHAINSAW CHAIN TOOTH MEASURING TOOL

CROSS REFERENCE TO RELATED APPLICATION

This application claims the benefit of U.S. Provisional Application No. 61/427,397 filed on Dec. 27, 2010, entitled "Chainsaw Chain Measuring Tool."

BACKGROUND OF THE INVENTION

1. Field of the Invention

The present invention relates generally to the field of chainsaws.

More specifically, the present invention pertains to a novel device that measures a chainsaw chain cutting tooth for sharpening.

A chainsaw is a portable cutting tool generally powered by a two-stroke engine or electric motor that drives a chain linkage of cutting teeth and connecting members. Chainsaws are used for a variety of purposes, most importantly tree felling and limbing. They are used by consumers around the home for general maintenance, and in professional settings for a variety of tasks, including cutting firebreaks to slow a forest fire and for harvesting wood.

The major components in a chain saw are the engine, drive mechanism, guide bar, and cutting chain. The cutting chain is made of riveted sections of metal that include cutting teeth, which are sharpened blades that are specially shaped to cut through and remove material as it is fed around the guide bar. The teeth are generally made from chromium plate steel that have a sharp angular or curved corner with cutting edges along its upper and side plate. The teeth alternate on the left and right side of the chain around the perimeter of the guide bar, which operates to support the chain while in motion.

Chainsaw chains are categorized by their pitch and gauge. Pitch is defined as half the length of three consecutive rivets, while the gauge is the thickness of a drive link at a location wherein it fits into the guide bar. Each tooth includes a depth gauge or raker, which sits in front of the tooth and limits the depth of the cut with each pass of the blade. This prevents the chain from cutting too deep, which will slow the rate of cutting, and from cutting too high, which can make the saw difficult to control.

Over time and after use, the teeth on a chainsaw may become dull and uneven, eventually requiring sharpening. The sharpening operation must be completed on the top plate cutting edge of each individual tooth. Some individuals sharpen their own chain; however manufacturers recommend having a chain resharpened by an authorized technician or dealer. Proper equipment and skills is required to precisely file or otherwise sharpen a chain cutting tooth. While general filing tools are available at most hardware stores, they are not adapted to measuring the required angles and width for chainsaw chain teeth. The width of the top plate must generally be filed with a precision of ±0.001 inches, which is extremely difficult to accomplish with conventional tools. Further, the angle of the top plate must be within a given tolerance to provide a proper cutting engagement plane.

The present invention improves upon chainsaw measuring devices by allowing a consumer to accurately and quickly measure the necessary widths and angles required for sharpening a chainsaw chain cutting tooth. The device comprises a caliper tool capable of measuring the width of the top plate with a precision of at least ±0.001 inches, and includes a built in angular gauge for measuring the angle of the top plate cutting edge. This tool allows individuals to safely and quickly sharpen a chainsaw chain without the use of a professional sharpening service.

2. Description of the Prior Art

Several devices have been disclosed in the art that measure the angle of the top plate cutting edge and width of the top plate for proper chainsaw chain sharpening. Rein, U.S. Pat. No. 6,105,446 discloses a device for the measuring of saw blades that has a receptacle for the turnable bearing of a saw blade as well as a measuring spindle which, with respect to the saw blade, is held adjustable and is born swingably about an axis parallel to the saw blade axis. On the measuring spindle there are arranged two measuring edges which together enclose an angle and are placeable on the cutting surface and on the release surface of a tooth. The measuring spindle has a low inertia moment and a friction-free bearing. This arrangement of components permits a simple and dependable execution of the measurement, even by inexperienced personnel, and the measurements of saw blades with different tooth sizes or states of wearing-down. Devices such as these are large and costly, and are not intended for home use by an individual user, but instead are suited for a commercial setting.

Other designs disclose a device that sets and measures angles using calipers. Economaki, U.S. Pat. No. 6,766,583 discloses an angle gauge that, when used in conjunction with a caliper or other linear measuring device, improves both the precision and ease with which angles can be measured and set by allowing the user accurately to measure and set angles in fractions of degrees. Using the gauge, an angle formed by the gauge may be determined or set by reference to the linear distance measured by the caliper. These devices are adapted to measuring angles on large pieces of equipment, and are not designed for measuring the small angles required for a chainsaw chain.

Other designs disclose calipers that can measure to a precision of ±0.001 inches. Kim, U.S. Pat. No. 7,685,735 discloses an electronic caliper with an adjustable digital display. In an embodiment the caliper includes an elongated body and a display member that pivots or rotates relative to the elongated body. The display member may include a base member, which is coupled with the elongated body for translational movement along at least a portion of a length of the elongated body, and a display coupled with the base member for pivotal movement between a first orientation and a second orientation. While such devices are useful for measuring the width of the top plate to its required degree of precision, they are not adapted for setting the top plate angle.

The present invention utilizes a unique design that allows for measurement of the top plate width to a precision of at least ±0.001 inches, and properly sets the angle for the top plate cutting edge. This allows a consumer to safely and properly sharpen a dull chainsaw chain cutting tooth to the proper width and angle, thereby saving considerable time and effort with having the chain sharpened by a professional sharpening service. The present invention substantially diverges in design elements from the prior art and consequently it is clear that there is a need in the art for an improvement to existing chainsaw chain measuring tools. In this regard the instant invention substantially fulfills these needs.

SUMMARY OF THE INVENTION

In view of the foregoing disadvantages inherent in the known types of chainsaw chain tooth measuring devices now present in the prior art, the present invention provides a new chainsaw chain tooth measuring device wherein the same can be utilized for providing convenience for the user when setting the proper to plate width and top plate cutting edge angle.

It is therefore an object of the present invention to provide a new and improved chainsaw chain tooth measuring device that has all of the advantages of the prior art and none of the disadvantages.

Another object of the present invention to provide a new and improved chainsaw chain tooth measuring device that assists with the sharpening a chainsaw chain cutting tooth.

Another object of the present invention is to provide a new and improved chainsaw chain tooth measuring device that measures the width of the top plate of a chainsaw chain tooth.

Yet another object of the present invention is to provide a new and improved chainsaw chain tooth measuring device that measures the top plate cutting angle on a chainsaw chain.

Another object of the present invention is to provide a new and improved chainsaw chain tooth measuring device that measures the width of the top plate of a chainsaw chain with a precision of at least ±0.001 inches.

Still another object of the present invention is to provide a new and improved chainsaw chain tooth measuring device that includes a fixed jaw that measures the top plate cutting angle of a chainsaw chain tooth.

A final object of the present invention is to provide a new and improved chainsaw chain tooth measuring device that allows a consumer to sharpen a chainsaw chain safely and properly without requiring the services of a professional chain sharpening service.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
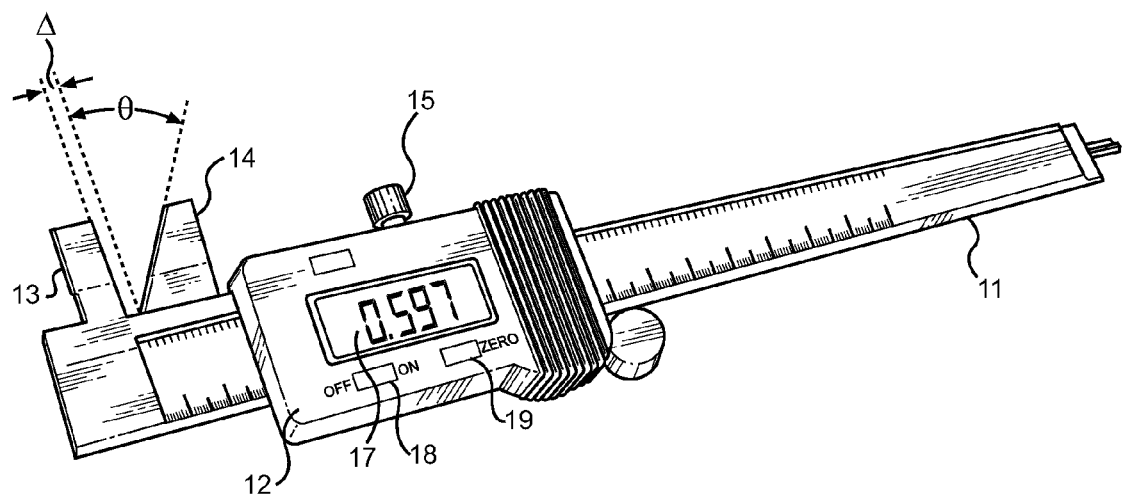
FIG. 1 shows a prospective view of the present invention, including the caliper body, sliding member, first and second fixed external jaws, locking means, display portion with a display, power button, and a zero/tare button.

Referring now to FIG. 1, there is shown a perspective view of the present invention, comprising a caliper body 11, a sliding member 12, a first fixed external jaw 13 a second sliding jaw 14, a locking means 15, a display portion 17, a power button 18 and a zero/tare button 19.

Figure 2:
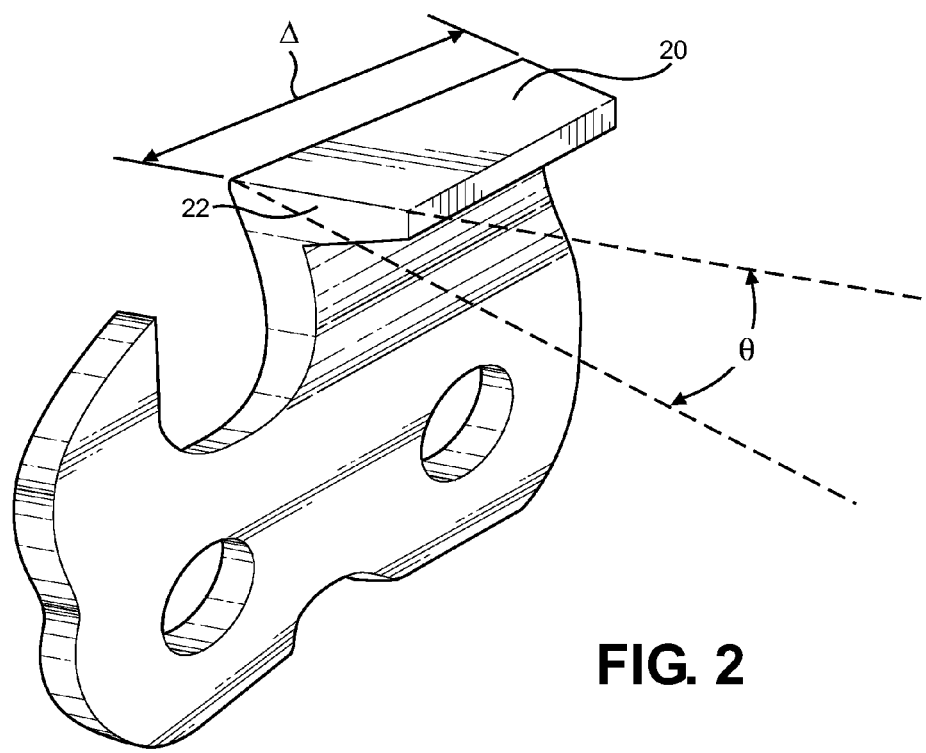
FIG. 2 shows a prospective view of a standard chainsaw chain tooth, including the top plate and the top plate cutting edge.

The sliding member 12 is coupled to the caliper body 11 and slides substantially along the entire length of the body 11. The first fixed external jaw 13 is attached to the first terminal end of the body 11 and creates a perpendicular extension with respect to the body 11. The second, sliding jaw 14 is joined to the sliding member 12 and slides therewith along the length of the body 11. The sliding jaw 14 is an angled section that forms an angle ($\theta$) with respect to the perpendicular first jaw 13, thereby creating a gauge used to measure the angle of the top plate cutting edge 22, as seen in FIG. 2. In a first embodiment, the angle ($\theta$) is 15 degrees, which is a common angle for chainsaw top plate cutting edges. In a second and third embodiment, the angle is 35 and 45 degrees, respectively; however such angles are provided for convenience and are not intended to limit the present invention. The sliding member 12 uses a locking means 15 for locking the sliding member 12 along the length of the caliper body 11. The first and second jaws 13, 14 are thereby locked into a static position with regard to one another, allowing consistent and accurate measurement of a chainsaw top plate.

Figure 3:
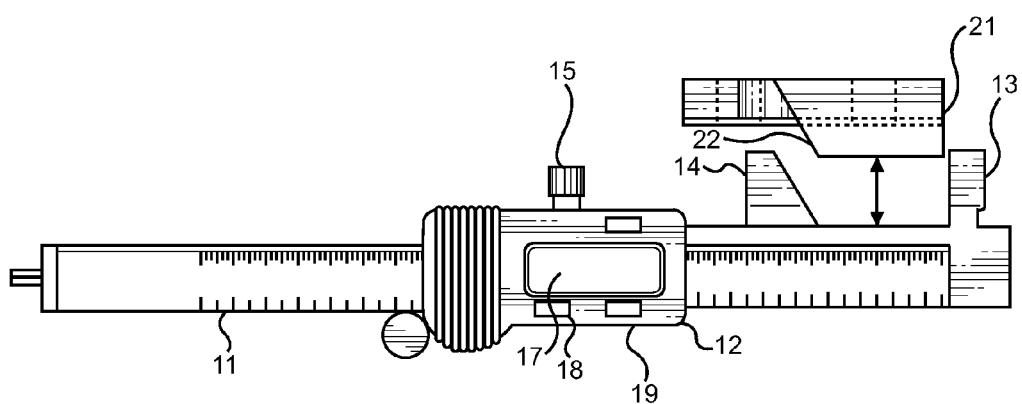
FIG. 3 shows a prospective view of the present invention, including the caliper measuring the width of a chainsaw chain tooth top plate and the angle of the top plate cutting edge.

The second jaw 14 and sliding member 12 slide along the caliper body 11, thereby allowing the top plate 21 to be positioned between the first and second jaws 13, 14 as seen in FIG. 3. The measuring means comprises conventional components for a caliper tool that are well known in the art for determining relative or absolute distance measurements.

As shown, the sliding member 12 includes a digital display 17. The sliding member 12 encloses various electronic and electrical components, such as a circuit board and other components required for the measuring means as typically found on a standard caliper tool. The display 17 is a digital display that is well known in the art, such as an LCD or TFT display, and is used for displaying the measurement captured by the distanced between the first and second jaws 13, 14. In addition, a power source such as a rechargeable or disposable battery may be configured into the sliding member 12, allowing for use of the device without a cord. Also shown is a power button 18 and a zero/tare button 19, which comprise push buttons for providing an input signal to the internal circuitry. The power button 18 allows a user to turn the device on and off as desired, while the zero/tare button 19 allows a user to reset or zero a measurement at a particular jaw gap distance.

While a digital display 17, power button 18, and a zero/tare button 19 are shown in the drawings, they are not limiting requirements of the present invention. In an alternate embodiment, the device can include graduations printed on the sliding member 12 and caliper body 11 used for measuring the width ($\Delta$) of the chainsaw top plate 21. An analog gauge may further be provided in lieu of the digital display 17 and control buttons, allowing for a measuring device that does not require electrical power or imbedded circuitry.

Referring now to FIG. 2, there is shown a perspective view of a typical chainsaw chain tooth, comprising a top plate 21, and a top plate cutting edge 22. The top plate 21 and the top plate cutting edge 22 are key components to the cutting operation of the tooth that require accurate sharpening when a chainsaw chain becomes less effective at cutting, becomes dull or begins to become unstable during cutting operations. The plurality of top plates 21 along a chainsaw chain must be of equal width to a precision of at least ±0.001 inches and have top plate cutting edges 22 filed to the same angle. If the top plates 21 or the top plate cutting edges 22 are not properly maintained, the chainsaw cutting teeth will be nonuniform, and can creating chainsaw binding and kickback while cutting, potentially leading to serious injury to the user or damage to the chainsaw itself.

Referring now to FIG. 3, there is shown a perspective view of the present invention, including a chainsaw tooth measuring device as described by the present invention, measuring the width ($\Delta$) of a chainsaw chain top plate 21 and the angle ($\theta$) of a top plate cutting edge 22. The first requirement for sharpening a chainsaw chain involves locating the shortest top plate 21 width, which is used to determine the width required for the remaining top plates 21. The remaining top plates 21 will be filed down to a width that is equal to the shortest top plate. As previously stated, this width must be measured to a precision of at least ±0.001 inches to adequately prevent kickback or nonuniform cutting teeth along the chain. To make the measurement, the caliper is positioned so the top plate 21 sits between the first jaw 13 and second jaw 14. The sliding member 12 is slideably positioned so that the first and second jaws 13, 14 firmly clamp the top plate 21. Once properly clamped, the locking means 15 is locked and a measurement is taken.

The second part of the sharpening process requires ensuring that the angle of the cutting edge 22 is uniform across all teeth along the chainsaw chain. The angle ($\theta$) of the second jaw 14 functions as an angle gauge for measuring the angle of the cutting edge 22 with respect to the opposing, perpendicular side of the top plate. Once again, the sliding member 12 is slideably positioned so that the first and second jaws 13, 14 clamp the top plate 21, with the first jaw 13 bearing against the perpendicular side of the top plate and the second jaw 14 bearing against the cutting edge 22. The angle of the cutting edge 22 is measured by comparing it to the gauge angle ($\theta$) on the second jaw 14. Any gaps between the second jaw 14 and the face of the cutting edge 22 show nonconformity. The cutting edge 22 can then be filed using filing techniques known in the art until the angle of the cutting edge 22 matches the gauge angle ($\theta$) of the second jaw 14, wherein the entire cutting edge 22 mates against the second jaw 14 along its angled edge.

The present invention provides a user with a convenient and inexpensive tool for measuring the quality and dimension of chainsaw teeth along a chainsaw chain. The shortest top plate can be measured, and if desired, can be carried through each top plate along the chainsaw length to ensure uniformity. The cutting edge angle can further be inspected and checked against a given angle, which is unique for the specific measuring tool. Different angle measurements may be provided on separate tools for a desired chainsaw angle. The locking means on the measuring tool allows each top plate to be compared to one another without changing the measured distance when moving from one chain tooth to another. The goal of the present invention is to reduce maintenance costs and increase time intervals wherein the chain must be professionally serviced.

To this point, the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A measuring tool for facilitating the accurate sharpening of chainsaw chain cutting teeth comprising:
    a caliper body, a sliding member, a first fixed jaw, and a second, sliding jaw;
    said first fixed jaw being coupled to said caliper body terminal end, wherein said fixed jaw has an outer edge and an inner edge, said inner edge forming a right angle with said caliper body;
    said second jaw coupled with said sliding member, wherein said second jaw has an outer edge and an inner edge, said inner edge forming a predetermined fixed angle of less than 90 degrees with said caliper body, creating an angle gauge for measuring a cutting edge angle of a chainsaw top plate,
    an adjustable distance between said first and second jaw adapted to be used to measure a chainsaw top plate width.

2. A device as in claim 1, wherein said angle gauge measures a 15 degree angle.

3. A device as in claim 1, wherein said angle gauge measures a 35 degree angle.

4. A device as in claim 1, wherein said angle gauge measures a 45 degree angle.

5. A device as in claim 1, wherein said sliding member further comprises a digital display member coupled with the caliper body.

6. A device as in claim 5, wherein said digital display member further comprises a display indicating indicia defining a distance measurement between said first and second jaws.

7. A device as in claim 1, wherein said sliding member further comprises an analog display member coupled with the caliper body.

8. A device as in claim 7, wherein said analog display member further comprises a display indicating indicia defining a distance measurement between said first and second jaws.

9. A device as in claim 1, wherein said sliding member further comprises a locking means for locking said sliding member along said caliper body.

10. A device as in claim 1, wherein said caliper body and said sliding member further comprise a plurality of graduations for measuring.

11. A device as in claim 1, further comprising a zeroing input means, said zeroing input means comprising a zeroing reset button on said sliding member to reset said display member.

12. A device as in claim 1, further comprising a power input means, said input means comprises a power button on said sliding member to place said measuring device in an operational or non-operational mode.

13. A device as in claim 1, wherein said width measurement comprises a precision of at least ±0.001 inches.

* * * * *